United States Patent
Udobot et al.

(10) Patent No.: US 6,460,353 B2
(45) Date of Patent: Oct. 8, 2002

(54) METHOD AND APPARATUS FOR IMPROVED AIRCRAFT ENVIRONMENTAL CONTROL SYSTEM UTILIZING PARALLEL HEAT EXCHANGER ARRAYS

(75) Inventors: Aniekan Udobot, Torrance; Ron Brager, West Hills; Larry Reed, Torrance, all of CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/798,588

(22) Filed: Mar. 2, 2001

(65) Prior Publication Data

US 2002/0121103 A1 Sep. 5, 2002

(51) Int. Cl.[7] .............................. F25B 9/00; F25D 9/00; F25D 17/04; F25D 21/06
(52) U.S. Cl. ............................... 62/86; 62/402; 62/415; 62/275
(58) Field of Search .................... 62/86, 401, 402, 62/415, 426, 275

(56) References Cited

U.S. PATENT DOCUMENTS

| | | | |
|---|---|---|---|
| 2,969,920 A | * 1/1961 | Giannoni | 62/86 |
| 3,208,234 A | 9/1965 | Messinger | |
| 3,612,164 A | * 10/1971 | Miner | 165/22 |
| 4,071,082 A | 1/1978 | Economides | |
| 4,127,011 A | * 11/1978 | Giles et al. | 62/402 |
| 4,238,933 A | * 12/1980 | Coombs | 62/238.6 |
| 4,262,495 A | * 4/1981 | Gupta et al. | 62/402 |
| 4,263,786 A | 4/1981 | Eng | |
| 4,283,924 A | 8/1981 | Schütze | |
| 4,430,867 A | 2/1984 | Warner | |
| 4,766,735 A | * 8/1988 | Gotou | 62/175 |
| 4,945,980 A | 8/1990 | Umezawa | |
| 5,085,037 A | 2/1992 | Scott-Scott | |
| 5,092,521 A | 3/1992 | Brown | |
| 5,461,882 A | 10/1995 | Zywiak | |
| 5,467,604 A | * 11/1995 | Sekigami et al. | 62/117 |
| 5,553,461 A | 9/1996 | Hitzigrath et al. | |
| 5,906,111 A | 5/1999 | Lui | |
| 5,918,472 A | 7/1999 | Jonqueres | |

* cited by examiner

Primary Examiner—William C. Doerrler
(74) Attorney, Agent, or Firm—William J. Zak, Jr. Esq.

(57) ABSTRACT

A heat exchanger subsystem for an environmental control system comprises a heat exchanger array having a plurality of heat exchanger elements that operate in parallel to an inlet cooling airflow to the heat exchanger array such that each load heat exchanger is connected to a separate load with each heat transfer loop operating in substantially independent fashion without load interaction effects. In addition, continuous ice and water removal is provided allowing continuous subfreezing operation improving cooling performance along with anti-ice provisions which recover rejected heat for improved energy efficiency. The heat exchanger elements may include air-to-air heat exchanger cores, liquid-to-air heat exchanger cores, and hot bars internal or external to the heat exchanger cores.

53 Claims, 11 Drawing Sheets

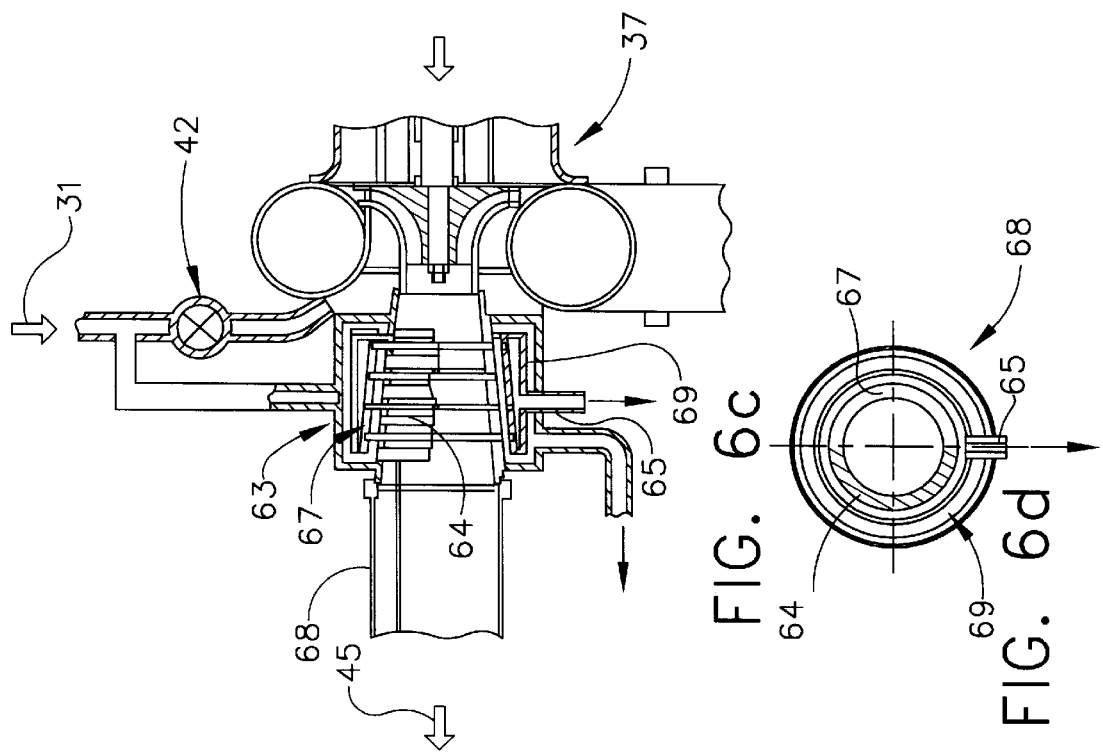
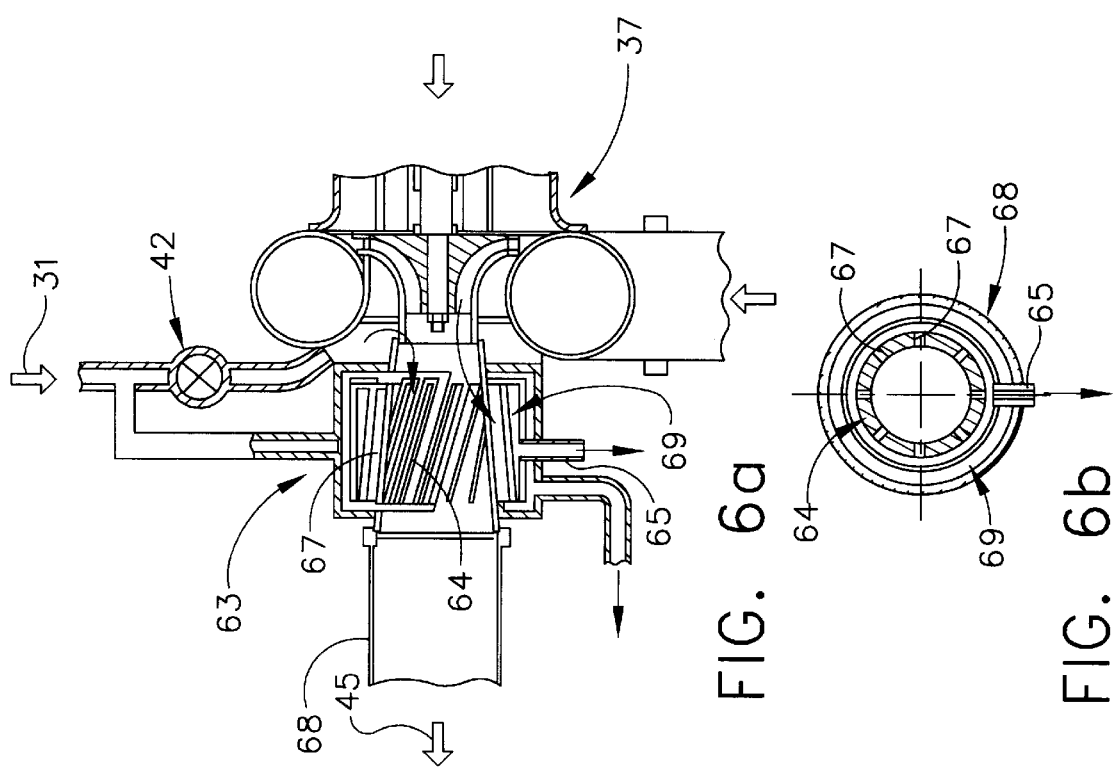

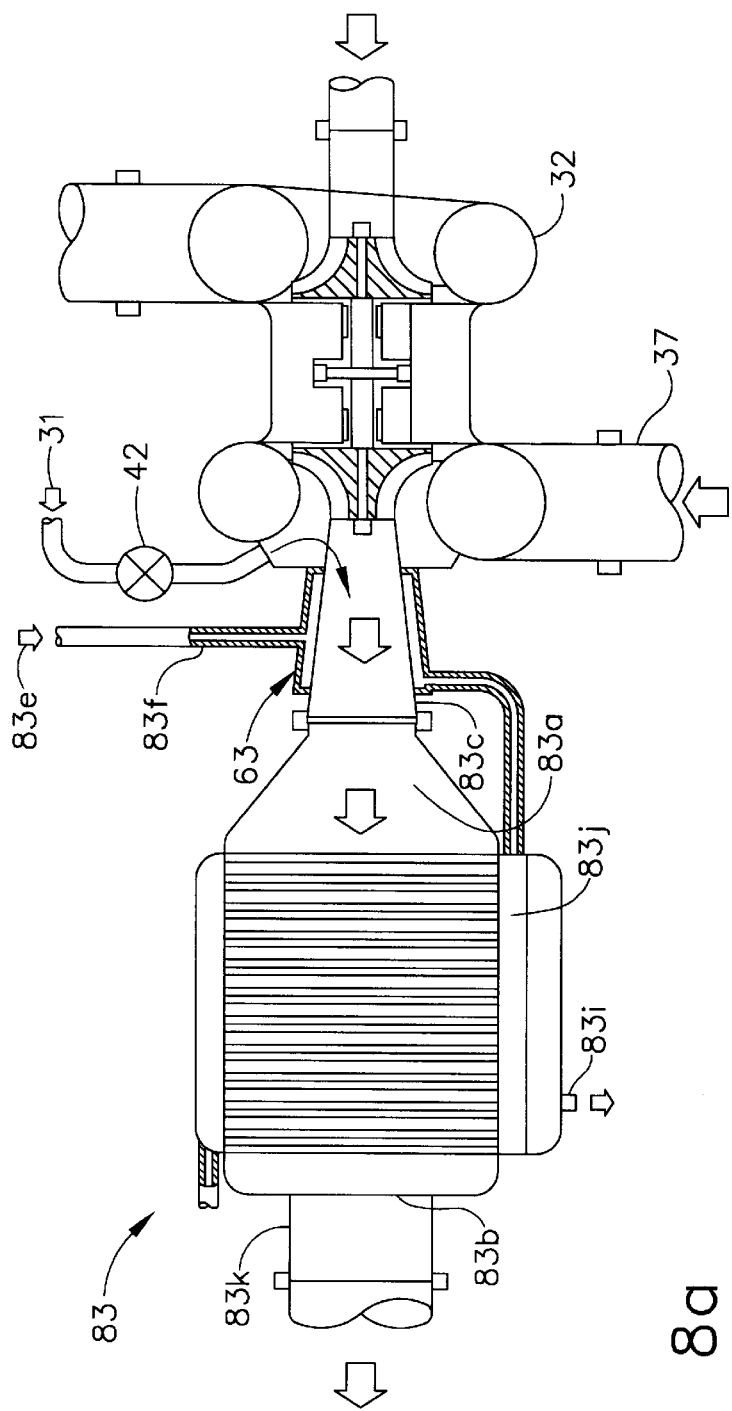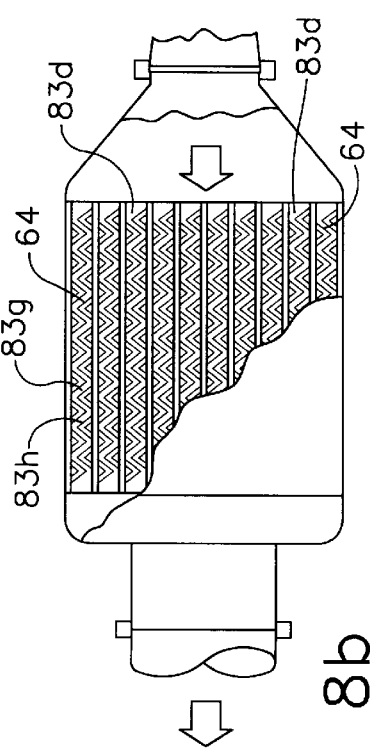
FIG. 8a
FIG. 8b

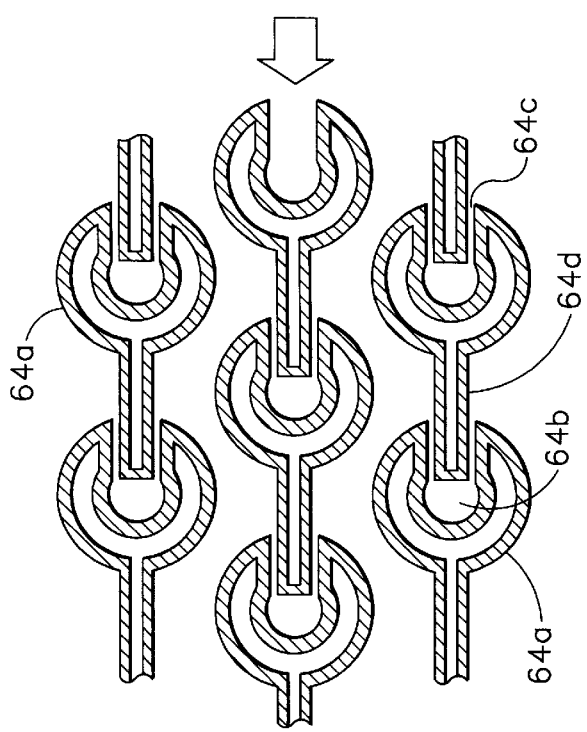
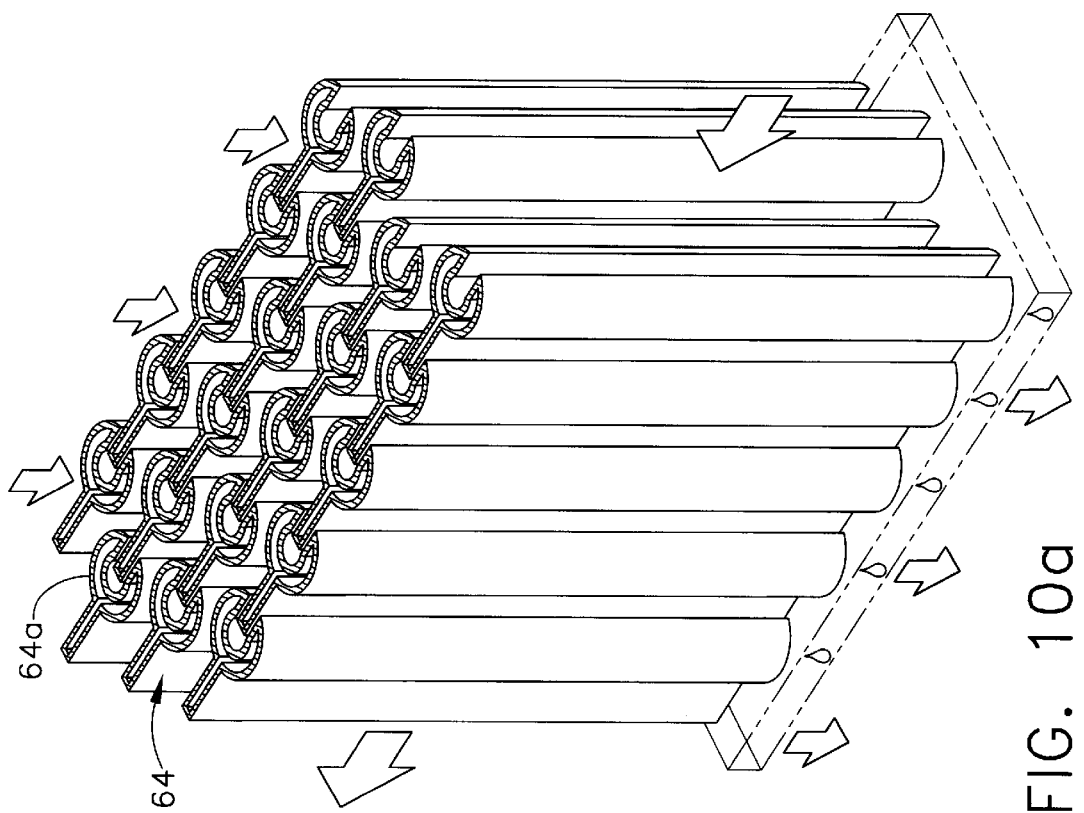
FIG. 10b
FIG. 10a

METHOD AND APPARATUS FOR IMPROVED AIRCRAFT ENVIRONMENTAL CONTROL SYSTEM UTILIZING PARALLEL HEAT EXCHANGER ARRAYS

BACKGROUND OF THE INVENTION

The present invention relates to environmental control systems and, in particular, to aircraft air conditioning and thermal management.

An aircraft environmental control system typically consists of an engine bleed air-driven high pressure air cycle system which provides conditioned, temperature-controlled, dehumidified air for cockpit and crew member cooling, pressurization, cooling of air-cooled avionics, cooling of liquid-cooled equipment (such as radar) and various other pneumatic utility subsystems. An example of a conventional prior art environmental control system adapted for military fighter aircraft use is depicted in FIG. 1. The air cycle refrigeration system 10 includes an air cycle machine 24, primary heat exchanger (not shown), secondary heat exchanger 13, condenser heat exchanger 15, water extractor 16, reheater 14, liquid-to-air load heat exchanger 18, together with sensors, valves and associated controls (omitted for clarity).

In operation, the compressor 12 driven by turbine 17 compresses preconditioned engine bleed air 11 with the heat of compression subsequently rejected to ambient air through the secondary heat exchanger 13. The cooling turbine 17 portion of the air cycle machine 11 extracts energy from the preconditioned bleed air 11 and chills the air to typically subfreezing temperatures (e.g., ~40 deg F.). This air is delivered to the hot side inlet of the condensing heat exchanger 15 which cools a cross-stream airflow output from the reheater heat exchanger 14, condensing entrained moisture into droplets which are removed in the water extractor 16. This airflow then passes through the reheater 14 and is delivered to the cooling turbine 17 inlet where the air is expanded through the turbine 17, giving up energy and is cooled in the process. This cooled air is further temperature regulated by the addition of hot bypass air through a temperature control valve (not shown) to provide temperature-controlled, dehumidified conditioned air 19.

A complication arises during operation when moisture is present as the air is cooled to below subfreezing temperatures since entrained water present in the air stream condenses into a fine spray of ice crystals. The ice entrained in the air stream will begin to accrete on downstream surfaces and, in particular, on the cold side inlet face of the condensing heat exchanger 15 and, if left unchecked, will back-pressure the turbine 17 and choke off flow.

To prevent excessive ice accumulation, anti-ice provisions, such as internal hot-air hot bars 23 incorporated into the condenser 15 face, are typically employed. Commonly, de-ice provisions are also provided consisting of a hot air bypass or anti-ice valve 22 to allow the hot bleed air 11 to bypass the cooling turbine 17 to melt any accumulated ice once a preset temperature and/or pressure drop is exceeded. The addition of heat to melt accumulated ice substantially reduces the available cooling capacity of the refrigeration unit and it is therefore desirable to minimize the add-heat function to the extent practicable.

Cooling of liquid-cooled loads is typically accomplished as shown in FIG. 1 by means of an added thermal transport loop connected to the refrigeration unit 10 by coolant lines 20 and 21 with suitable pumping means (not shown) to a remotely located liquid-cooled load(s). Waste heat from liquid-cooled load(s) such as radar is rejected to the liquid-to-air load heat exchanger 18 disposed either upstream or downstream of the condenser 15 in a series arrangement. This additional heat often presents a severe performance penalty and must be carefully considered in the design to avoid degrading condenser operation and, hence, water removal and to avoid undercooling of the cockpit or air-cooled equipment.

The series arrangement of condenser 15 in front of the liquid-to-air load heat exchanger 18 as shown in FIG. 1 creates two main performance problems. First, the coldest inlet air the downstream heat exchanger 18 experiences is limited by the minimum outlet temperature of the upstream heat exchanger 15. As a result, the performance of the downstream heat exchanger 18 is often less than optimal or desired, resulting in elevated liquid supply temperatures (e.g., in excess of 110 deg F. for a ~9 kw load in a typical case). For refrigeration packs with the condenser 15 located upstream of the liquid-to-air load heat exchanger 18, the liquid heat load that can be rejected is limited by the maximum air temperature of cooling air delivered to the cockpit and/or air-cooled avionics equipment. In the case of a liquid-to-air load heat exchanger 18 located upstream of the condenser 15, condensing operation may be degraded to an unacceptable degree as a result of high cold side inlet temperatures such that efficient condenser 15 operation no longer occurs. This, in turn, results in excessive humidity and moisture delivered to the cockpit and/or air-cooled equipment and increasing sensible heat.

The second performance problem associated with prior art environmental control systems is inadequate ice control and removal. The prior art approach in high pressure air cycle systems is to reduce the amount of entrained moisture entering the cooling turbine 17 by means of a condenser 15 and a swirl type inertial water extractor 16. The amount of water removed is dependent on the internal surface metal temperature of the condenser 15, i.e., the lower the temperature, the larger the condensed droplets. Not all of the water is necessarily removed, however, particularly under low altitude, moist, tropical day conditions. This entrained moisture condenses into ice crystals as the air is expanded through the cooling turbine 17 to below freezing temperatures. The resultant ice discharged from the cooling turbine 17 tends to accrete on chilled surfaces of downstream ducting and the inlet face of the downstream heat exchanger 15, eventually freezing over the heat exchanger inlet and interrupting airflow unless de-ice or anti-ice control provisions are incorporated. Operation of de-ice or anti-ice controls, however, directly subtracts from the inherent refrigeration capacity of the cooling turbine 17. Use of hot air de-ice should therefore be minimized to avoid excessive conditioned air supply temperatures. A further difficulty arises when ice that is allowed to accumulate and then melt as the resultant slug of liquid water is introduced in the conditioned air stream, necessitating additional drainage provisions.

As may be seen from the foregoing discussion, there is a need for an environmental control system that provides improved efficiency and anti-ice control.

SUMMARY OF THE INVENTION

In one aspect of the present invention, a heat exchanger subsystem for an environmental control system comprises a heat exchanger array having a plurality of heat exchanger elements that operate in parallel to an inlet airflow to the heat exchanger array such that each heat exchanger element is thermally connected to a separate load that is thermally independent or isolated from other loads. In particular, an environmental control system is disclosed comprising a heat exchanger subsystem downstream of an air cycle machine cooling turbine, with the subsystem having an air-to-air heat exchanger and a liquid-to-air heat exchanger which operate in parallel with each other when connected to an inlet airflow to the heat exchanger subsystem. The heat exchanger subsystem enables accommodation of relatively large liquid-cooled loads without degradation of cooling or interaction with air-cooled loads.

In another aspect of the invention, an anti-ice control subsystem having an array of parallel heat exchange elements or hot bars is disclosed for use in conjunction with a heat exchanger of relatively narrow coldside air passage fin spacing such as a liquid-air heat exchanger external to and upstream of the liquid-air core. The anti-ice control subsystem enables subfreezing operation of the liquid-air heat exchanger without ice over or blockage of the heat exchanger, particularly in the case wherein integration of conventional internal hot bar heating elements is not feasible.

In a further aspect of the present invention, an environmental control system is described which includes a heat exchanger subsystem for continuous removal of ice crystals and water droplets from an air stream discharged from a cold air source such as an air cycle machine, enabling continuous subfreezing operation of the environmental control system and obviating the need for intermittent de-ice cycling, thereby substantially improving cooling performance. The heat exchanger subsystem comprises a plurality of heat exchange elements in a parallel array for melting of ice crystals present in an air stream impacting the heat exchange elements; a plurality of heated slots or openings disposed between the heat exchange elements for capture of ice crystals or water droplets; a heated circuit or fluid passage(s) connected to a heat source; a cold air circuit or fluid passage(s) connected to a cold air source such as an air cycle machine; a heated chamber, sump, or plenum for collection of water droplets; and heated drainage provisions for disposal of collected liquid water. In a preferred embodiment, the anti-ice heat exchange elements utilize heat energy normally rejected overboard either from hot compressed bleed air or heat recovered from downstream air-cooled or liquid-cooled loads. Ice melted by the recovered heat energy is removed by a heated chamber integrated with the heat exchanger subsystem.

In yet another aspect of the present invention, a method of recovering waste heat from a liquid-cooled load is used to provide anti-ice control by a parallel array of heat exchange elements or hot bars, reducing or eliminating ice accretion within refrigeration system components downstream of the cooling turbine. Recovery of waste heat energy reduces hot bleed air consumption for improved energy efficiency, allows subfreezing cooling turbine operation, and maximizes cooling system performance.

These and other features, aspects and advantages of the present invention will become better understood with reference to the following drawings, description and claims.

BRIEF DESCRIPTION OF THE DRAWINGS

FIG. 4b is a partial schematic top view of the liquid-air heat exchanger and external hot bars shown in FIG. 4a;

FIG. 4c is a partial schematic side view of the liquid-air heat exchanger and external hot bars shown in FIG. 4a;

FIG. 6a is a side cross sectional view of a heated duct jacket having a heat exchanger array in accordance with the present invention;

FIG. 6b is a cross sectional view of the heated duct jacket shown in FIG. 6a and taken along lines 6a-6a;

FIG. 6c is a side cross sectional view of a heated duct jacket having a heat exchanger array in accordance with another embodiment of the present invention;

FIG. 6d is a cross sectional view of the heated duct jacket shown in FIG. 6c and taken along lines 6c-6c;

FIG. 7b is a schematic view of the flows in the cross-parallel turbulator shown in FIG. 7a;

FIG. 8a is a cross sectional schematic diagram of an ice particle and water extractor formed of parallel heat exchanger elements with drainage provisions situated downstream of a cold air source (i.e., cooling turbine);

FIG. 8b is a partially broken away view of the extractor shown in FIG. 8a;

FIG. 9b is an end view, cross sectional schematic diagram of the parallel heat exchanger elements and heat exchanger array of FIG. 9a;

FIG. 10a is a cross sectional schematic diagram of parallel heat exchanger elements in a heat exchanger array illustrating an alternative embodiment to that shown in FIGS. 8a and 9a in accordance with an embodiment of the present invention;

FIG. 10b is an end view, cross sectional schematic diagram of the parallel heat exchanger elements and heat exchanger array of FIG. 10a.

DETAILED DESCRIPTION OF THE INVENTION

The present invention provides an improvement over conventional environmental control systems, such as those in aircraft, with the object of providing maximum cooling of various air loads, such as a cockpit and air-cooled avionics equipment, while providing simultaneous cooling of liquid-cooled loads with improved energy efficiency. In an embodiment of a condensing air-to-air heat exchanger and a liquid-to-air load heat exchanger, both heat exchangers are disposed in a parallel, modular arrangement such that both heat exchangers are simultaneously exposed to a common cold air source (i.e., cooling turbine) at subfreezing air supply temperatures. As a result, liquid supply temperatures in a typical application may be reduced by about 40–50° F. over conventional systems with equivalent loads. Heat dissipation from liquid-cooled heat loads is accomplished with minimum interaction effects on temperature and humidity of delivered cooling air supply. In applications wherein the liquid load heat exchanger is installed upstream of the condenser, condenser performance is substantially improved as a result of the reduced inlet temperatures afforded by reduced hot air bypass flow and/or subfreezing turbine discharge temperatures providing increased water extraction and lower overall entrained moisture.

Additionally, waste heat recovered from either a liquid-cooled or air-cooled load may be used to provide anti-ice control of both the condenser air-to-air heat exchanger(s) and liquid-to-air heat exchanger(s). The liquid-cooled load or heat source, for example, may be in the form of liquid-cooled radar whereas the air-cooled load may consist of air-cooled avionics equipment, crew occupied compartments, or other heat source such as compressed bleed air from the air cycle machine compressor, etc.

The present method and system disclosed provides efficient, parallel processing of cooling air flows, maximizing inherent refrigeration unit cooling capacity; minimizes hot air de-ice functions that otherwise increase conditioned air supply temperature; enables continuous subfreezing operation of an environmental control system refrigeration unit without excessive ice accretion; provides for continuous removal of entrained ice particles and water droplets from an airstream; minimizes bleed air extraction; and recovers waste heat for anti-ice control for improved energy efficiency.

Figure 1:
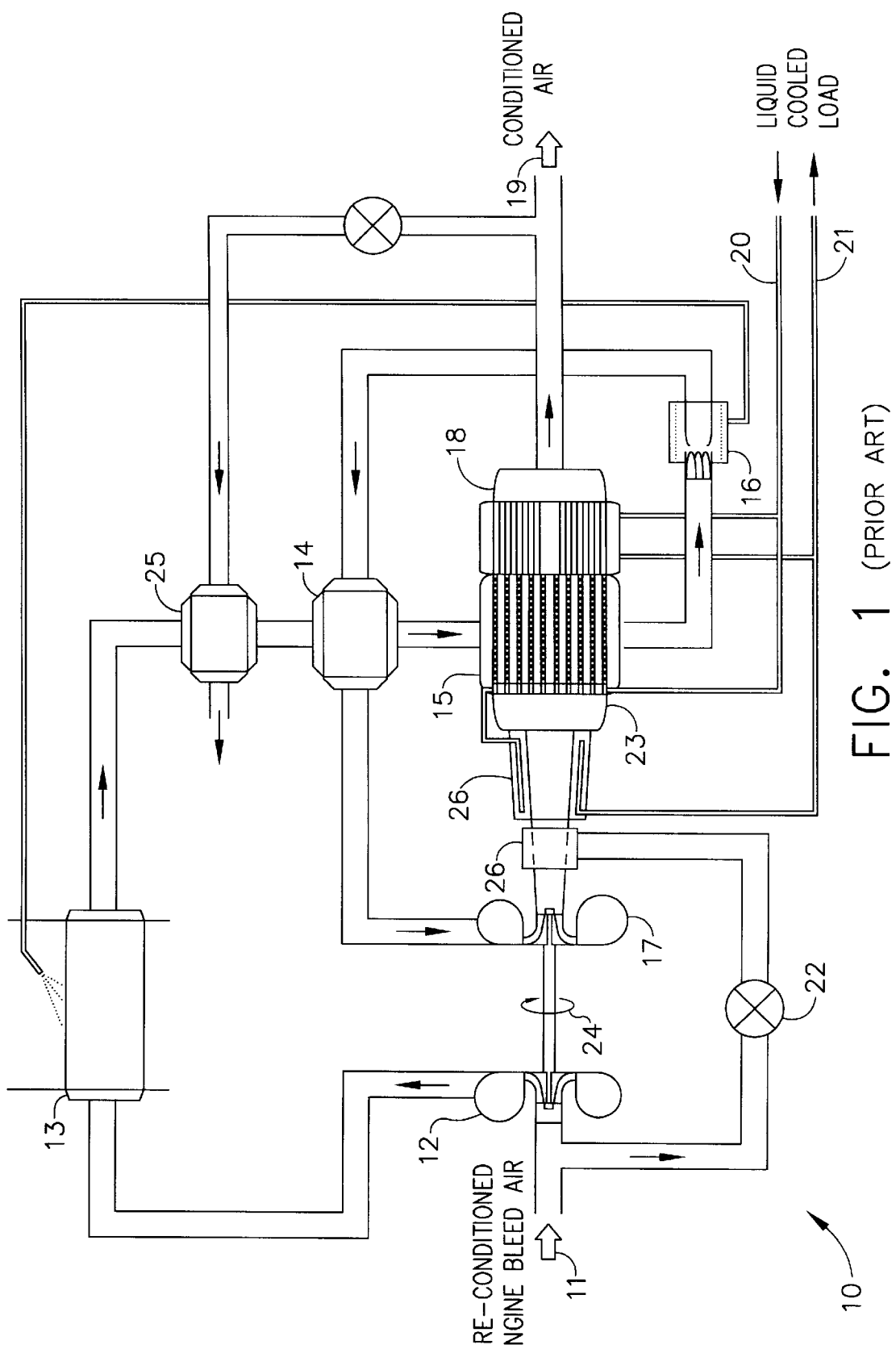
FIG. 1 is a schematic diagram of an example of a conventional prior art air cycle environmental control system.

FIG. 1 schematically depicts an example of a prior art air cycle environmental control system (ECS) 10, the operation of which is summarized as follows. Pre-conditioned bleed air 11, as derived from a pressurized air source such as a jet engine and initially cooled within a primary heat exchanger (not shown), is compressed and heated by the compressor 12 which is part of the air cycle machine 24. The compressor 12 is powered by the bootstrap turbine 17 mounted on a common shaft that is part of the air cycle machine 24. The added heat of compression of the engine bleed air is rejected to ram air in the secondary heat exchanger 13. Upon cooling in the secondary heat exchanger 13, the bleed air flows into a reheater heat exchanger 14 where the air is further cooled by heat exchange from the air exiting the condensing air-to-air heat exchanger 15. From the reheater 14, the air flows into the condenser 15 where moisture in the air is condensed. The downstream water extractor 16 then removes the preponderance of the condensed water droplets present in the air stream. The dried air discharged from the water extractor 16 passes back into the reheater 14 where the air is reheated by heat exchange with the incoming bleed air 11 to re-evaporate remaining moisture in the air stream. The reheated air from the reheater 14 is then expanded by the turbine 17, extracting energy from the process air and thereby cooling the air to at or below subfreezing temperatures.

In the event of ice formation, such as when the turbine 17 discharge air is too cold and moisture laden air condenses into ice particles, hot bleed air 11 may be added via the anti-ice valve 22 to the turbine 17 discharge air to melt accumulated ice. Conventional design practice allows ice to build up on the downstream condenser 15 until a preset differential pressure drop as measured across the heat exchanger 15 is exceeded before the anti-ice valve 22 is opened. To prevent ice from adhering to downstream duct surfaces, a heated duct jacket 25 is typically employed. Ice blockage of the condenser cold side inlet is normally prevented by addition of internal hot bars 23 comprising a plurality of heated tubes incorporated into the heat exchanger core upstream of the fin passages. The hot bars 23 are typically heated by means of hot air or liquid.

As shown in FIG. 1, the turbine cooling air flows through the cold side of condenser heat exchanger 15 where the cross flow air is cooled, enabling condensation. The turbine-cooled air then flows through the liquid-to-air load heat exchanger 18 that is in a series arrangement with the heat exchanger 15 for cooling of a remotely connected liquid load by means of the coolant lines 21 and 22. The conditioned air 19 is subsequently delivered to the cockpit and air-cooled equipment with a portion of the cooling flow typically diverted to a regenerative heat exchanger 25.

The liquid load that can be accommodated in a system of FIG. 1 must be managed to a low enough level so as to not excessively warm the conditioned air delivered to the crew/passenger compartment and/or air-cooled avionics. The available cooling capacity in a conventional system as shown in FIG. 1 is typically limited to maintain temperatures above freezing to avoid ice accretion. Addition of hot compressor bypass air to melt ice sacrifices inherent cooling capacity. The loss in cooling capacity is often substantial, accounting for up to ~50% of the total flow in a typical application with a corresponding decrease in cooling capacity.

It is a feature of the present invention, however, that higher liquid-cooled heat loads may be accommodated without degradation or interaction with air-cooled heat loads and that the use of de-icing provisions will not ordinarily be required except under extreme icing conditions (e.g., sea level, tropical day) as a result of the anti-ice control provisions, thereby avoiding the use of hot bleed air for de-ice and, thus, maintaining conditioned air delivery temperatures as low as possible.

Figure 2:
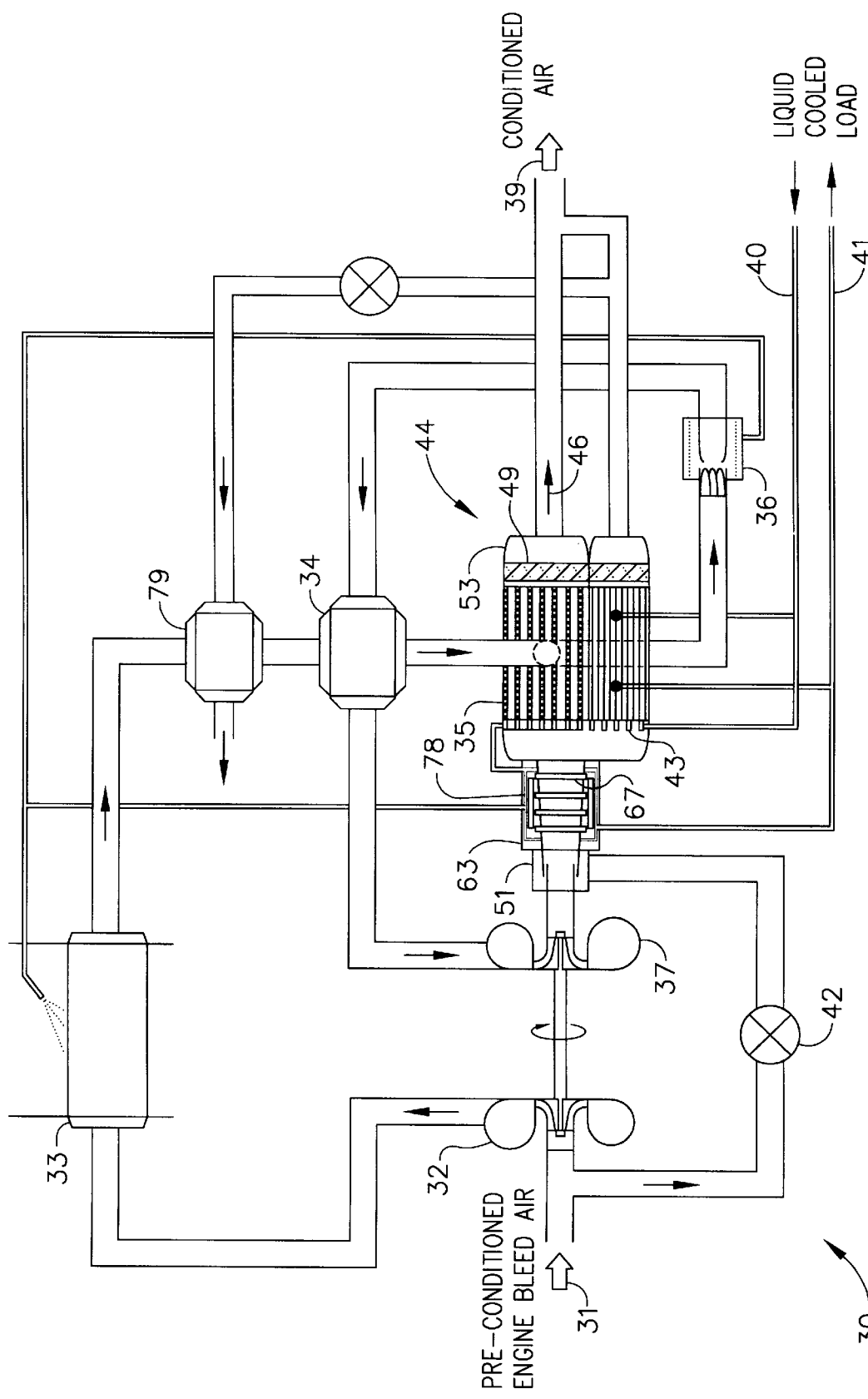
FIG. 2 is a schematic diagram of an environmental control system having a parallel heat exchanger subsystem comprising an array of heat exchanger elements oriented in parallel to a turbine discharge airflow in accordance with one embodiment of the present invention.

Referring to FIG. 2, one embodiment of an air cycle environmental control system 30 is shown schematically with a parallel array of heat exchangers. In operation, pre-conditioned engine bleed air 31 is introduced to a compressor 32 where it is compressed, increasing air pressure and temperature. The heat of compression is rejected overboard to ram air by means of a secondary heat exchanger 33. The cooled bleed air is subsequently directed through a regenerative heat exchanger 79 where the cooled bleed air is further cooled by pack discharge conditioned air 39. The bleed flow is further cooled after passage through a reheater 34 by cooling flow from a condenser/reheater loop and passage through the hotside flow passages or circuit of condenser 35 which is cooled by a cold air discharge from turbine 37. Heat may be added to the cold air discharge via bleed air 11 through an anti-ice valve 42.

The bleed flow next enters a water extractor 36 where a portion of the entrained water is removed and is then routed through the coldside flow passages or circuit of the reheater 34 wherein the flow is reheated to vaporize residual moisture present. The bleed flow is then expanded through the cooling turbine 37 wherein the turbine 37 extracts energy from the flow reducing temperature. The work energy extracted by the turbine 37 drives the compressor 32. Cold air discharge from the turbine 37 is ducted though a heated duct jacket 63 to a heat exchanger subsystem 44.

Inner duct walls of the heated duct jacket 63 are provided with slot openings or perforations 67 to allow ice crystals or water droplets present in the turbine discharge to enter a heated outer chamber 78 included as part of the heated duct jacket 63. Ice crystals and water droplets will tend to migrate in a generally outward radial direction due to high centrifugal forces imparted by the cooling turbine 37. The heated duct jacket 63 further includes a plurality of parallel heat exchanger elements 64 adjacent the slot openings or perforations 67 in the inner duct wall to prevent ice over or blockage of the openings or perforations 67. The heated chamber 64 includes a sump that allows collected water and melted ice to exit though a water drain 65.

As shown in FIG. 2, the heat exchanger subsystem 44 comprises a heat exchanger array that may include the air-to-air heat exchanger element 35, a liquid-to-air heat exchanger element 38, and a plurality of parallel heat exchanger elements or hot bars 43 proximate to the heat exchanger cores 35, 38. Although only one air-to-air heat exchanger 35 and one liquid-to-air heat exchanger 38 are depicted in FIG. 2, it should be understood that more than one of either or both such heat exchangers may be employed. As shown in this embodiment, the heat exchanger elements or cores 35, 38 are arranged in the heat exchanger array wherein the heat exchanger elements or cores 35, 38 are in a side-by-side modular arrangement and may be thermally insulated from one another. Where potential leakage of liquid coolant from a heat exchanger 35 or 38 is to be avoided, a buffered heat exchanger of conventional design with an intervening air passage (e.g., air fin and liquid fin passages separated by a buffer zone, jacketed tube, etc.) may be substituted, although at reduced heat exchanger effectiveness. Due to the side-by-side arrangement of the heat exchanger array to the turbine discharge flow, each heat exchanger core 35, 38 simultaneously receives a cold air supply thereby avoiding thermal interaction (i.e., heat exchange between adjacent heat exchanger cores).

The heat exchanger core 35 may be equipped with conventional internal hot bars 50 which is feasible due to the relatively large fin passage spacing associated with air-to-air heat exchangers. In the instance of the liquid-to-air heat exchanger 38 that is characterized by relatively small fin spacing, it is a feature of the present invention to provide external hot bars 43 immediately upstream of and proximate to the liquid-air heat exchanger core 38 for anti-ice control. During operation at high flow rates and subfreezing inlet temperatures, there may be insufficient heat transfer from the liquid-to-air heat exchanger core 38 to prevent ice accumulation or melt ice once it is formed on a coldside inlet face of the heat exchanger 38, particularly at the leading edge surfaces of reinforced "hail" fins that are normally used. Internal hot bars are generally not practical for high fin density heat exchangers due to excessive pressure drop and restricted flow of a heating fluid. Hence, it is a feature of the present invention to add external hot bars 43 proximate to and immediately upstream of the heat exchanger 38 coldside inlet face 58 to preclude ice over or blockage and subsequent de-ice activation or cycling which would otherwise occur and thereby impair cooling system performance.

To minimize temperature stratification of coldside air discharged from the heat exchanger subsystem 44, a mixer/coalescer 49 may be provided in another aspect of this invention to turbulate the exit flow and effect lateral transport and mixing of the airflow, thereby achieving more uniform temperature profile, reducing any temperature control inaccuracy, and reducing instability problems associated with sensed temperature errors by downstream temperature sensors. The mixing action may be accomplished by a cross-parallel arrangement of stacked, wavy or chevron fins. The mixer/coalescer 49 additionally provides a coalescing action as water droplets that may be present in the airstream impinge on the fin surfaces of mixer/coalescer 49 and, as a result, tend to agglomerate into larger drops. Droplets formed will tend to flow along the fin surfaces and be channeled to the side by the accordion-shaped fin folds.

A coldside exit plenum 53b of the heat exchanger assembly 44 may include a drainage provision downstream of mixer/coalescer 49 to drain off any shed liquid water and to further dry the conditioned air and, in particular, to remove water created as a result of de-ice and/or anti-ice operation upstream. Water removed by the upstream heated duct jacket 63 and downstream mixer/coalescer 49 may advantageously be added to the water removed by the water extractor 36 to aid in evaporative cooling of the secondary heat exchanger 33.

Figure 3:
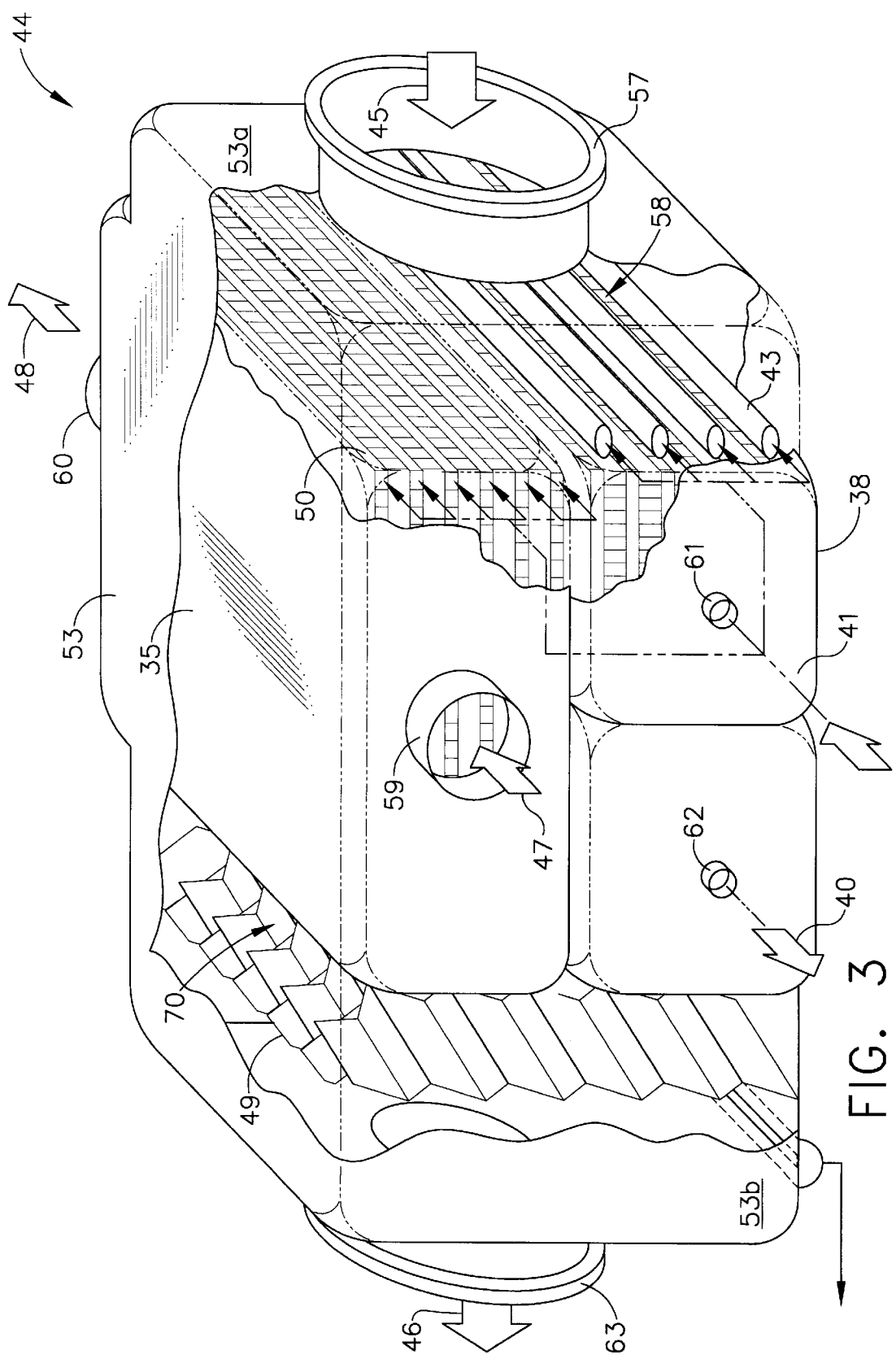
FIG. 3 is a perspective view partially broken away of a heat exchanger subsystem in accordance with an embodiment of the present invention illustrating a plate fin, 2-pass, crossflow-parallel liquid-air heat exchanger in parallel stack arrangement with an air-to-air cross-flow, plate fin condenser heat exchanger including anti-ice control provisions.

A detailed view in partial section of the heat exchanger subsystem 44 shown in FIG. 2 is illustrated in FIG. 3. As shown, a turbine discharge air or a coldside inlet turbine discharge airflow 45 enters coldside inlet plenum 53a of heat exchanger assembly 53. The inlet faces of the heat exchanger cores 35, 38 are warmed by a plurality of anti-ice heat exchanger elements or hot bars that form a part of the heat exchanger array. The heat exchanger elements may include a plurality of heat exchanger elements 43 adjacent or proximate to the coldside air inlet face 58 of the liquid-to-air heat exchanger 38. In particular, the elements 43 may be internal or the inlet plenum 53a but external to the heat exchanger core 38 in the case of closely-spaced, high-fin density heat exchangers where internal hot bars may not be practical due to a combination of restricted flow and excessive pressure drop.

Similarly, a plurality of heat exchanger elements or internal hot bars 50 may be embedded within the coldside inlet face of the air-to-air heat exchanger core 35. Thus, the elements 50 may be constructed in the form of hollow tubes such that they are internal of the inlet plenum 53a, as well as internal to the heat exchanger core 35, as in conventional design practice with heat exchangers of relatively low fin density.

In operation, the coldside inlet airflow 45 enters the heat exchanger assembly 44 through coldside air inlet 57 and passes through heat exchanger cores 35 and 38 and through turbulator 49. The flow exits out of coldside air outlets 70 and 71 of the heat exchanger cores wherein the outlets 70 and 71 are within an inlet plenum 53b in the form of a coldside outlet airflow 46. The coldside outlet airflow 46 then exits through outlet 63. Concurrently, a hotside inlet airflow 47 from the reheater 34 enters a hotside air inlet 59 of the air-to-air heat exchanger 35 and exits a hotside air outlet 60 of the air-to-air heat exchanger 35 as a hotside outlet airflow 48. A hot liquid coolant 41 returned from an external liquid-cooled load (not shown) enters a hotside inlet 61 of liquid-air heat exchanger 38 and exits the hotside outlet 62 as a cooled liquid coolant 41.

Figure 4B:
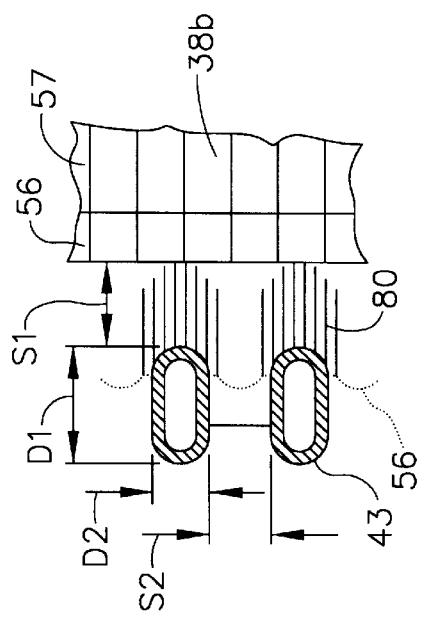
Figure 4C:
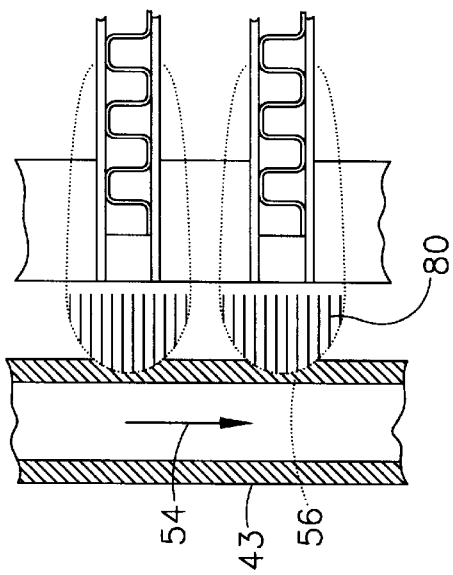
Figure 4A:
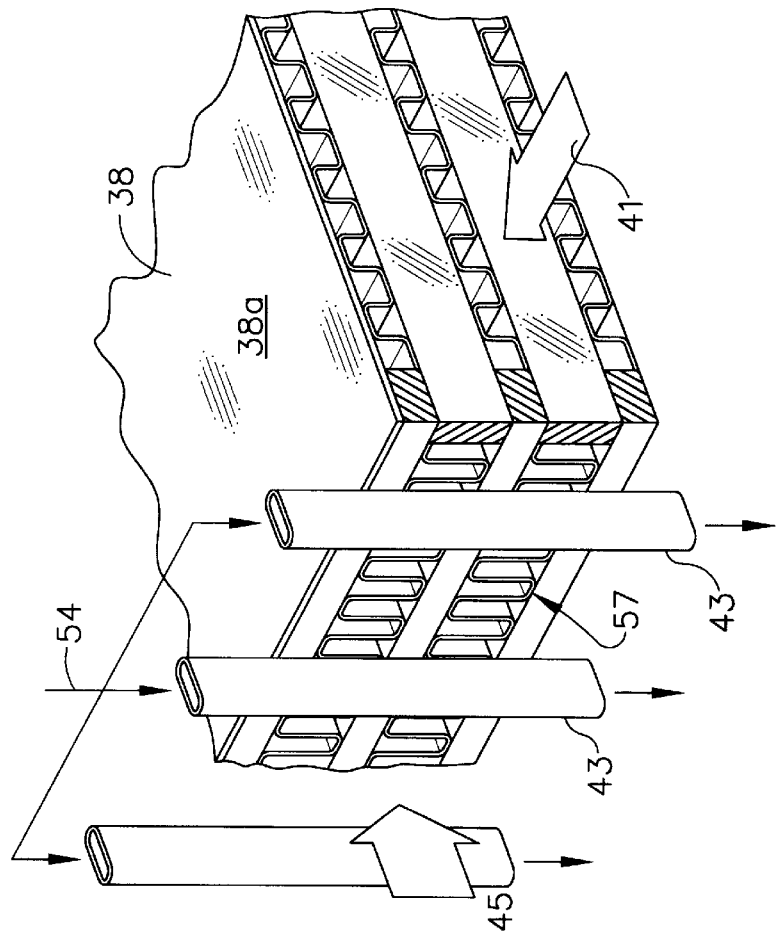
FIG. 4a is a partial perspective view of a liquid-air heat exchanger of a heat exchanger subsystem shown in FIGS. 2 and 3, together with external hot bars, in accordance with an embodiment of the present invention.

FIGS. 4a to 4c depict partial enlarged views of an embodiment of the external heat exchanger elements or hot bars 43 juxtaposed to the liquid-to-air heat exchanger 38. In the embodiment shown in FIG. 4a, a plurality of heat exchanger elements 43 is proximate to the coldside air inlet 57 and in thermal contact with the coldside inlet airflow 45. The heat exchanger elements 43 may be hollow, tubular elements that may be heated by a suitable hot fluid 54 such as bleed air 31 or hot liquid coolant 40.

As shown in FIG. 4b, the heat exchanger elements 43 may be spaced apart from one another by a distance s2 and spaced from the coldside air inlet 57 by a distance of s1. While the distances can vary, s2 is on the order of ~¼" to 1" and s1 is ~0" to ¼" i.e., the heat exchanger elements 43 may be in direct contact with the fin surfaces at the coldside air inlet 57. The heat exchanger elements 43 may all have a flattened circular or an oval cross sectional configuration with a dimension D1 by D2, as shown in FIG. 4b to minimize airflow pressure drop. Again, while the dimensions may vary, D1 is ~¼" to ⅜" and D2 is ~⅛" to ¼". However, the heat exchanger elements 43 need not be all of the same configuration and dimension. In any event, as the heated fluid 54 flows through the heat exchanger elements 43, the heat dissipated melts ice 56 that would otherwise accumulate in and about the coldside air inlet in a melt zone 80. The resultant water droplets are then reentrained into the airstream and removed in conventional fashion by downstream water drains or traps (not shown).

Figure 5:
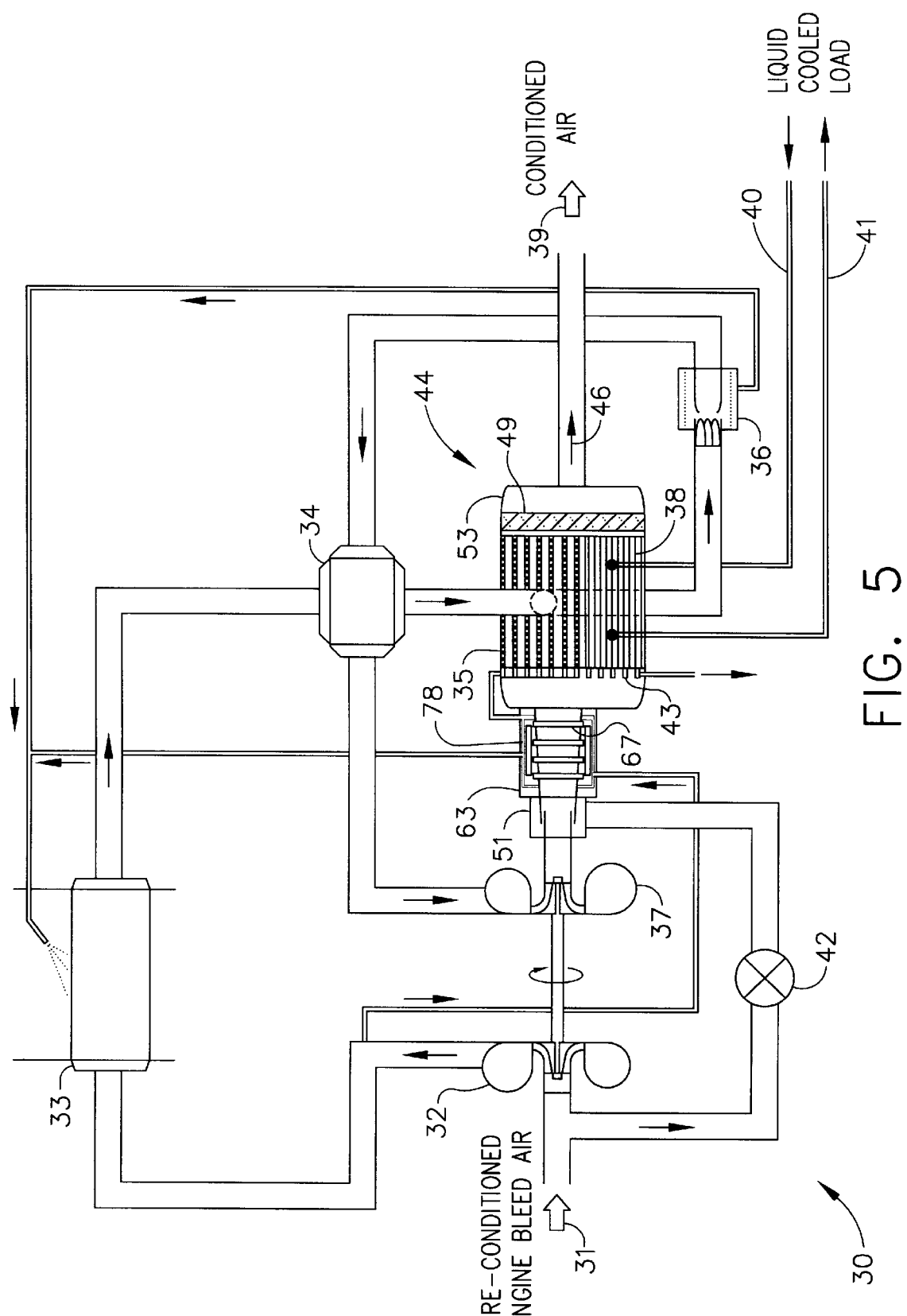
FIG. 5 is a schematic diagram of an environmental control system having a heat exchanger array with an air-to-air heat exchanger (i.e., condenser) and a buffered liquid-to-air heat exchanger in parallel arrangement disposed downstream of a cooling air source (i.e., cooling turbine) and including a parallel array of anti-ice hot bar heat exchange elements situated between the cold air source and the heat exchanger array in accordance with the present invention.

As mentioned above, the heat exchanger subsystem 44 having a heat exchanger array of heat exchange elements can be employed in various embodiments. In an example, FIG. 5 schematically depicts a further embodiment of an environmental control system 30 with parallel heat exchanger elements. This embodiment differs from the embodiments of FIGS. 2 and 3 in two general respects. In the embodiment of FIG. 5, the heat exchanger subsystem 44 includes a buffered liquid-air heat exchanger 38 whereas the previous embodiments illustrate un-buffered liquid-air heat exchangers. As described above, the reference to "buffered" means air fin and liquid fin passages separated by a buffer zone, jacketed tube, etc. In addition, the use of compressor hot air is shown in FIG. 5 whereas the previous embodiments illustrate the use of return liquid load coolant 41 as a heat source to the heated jacket 63. This variation features additional safety protection in the event of liquid coolant leakage and the potential hazards associated with the introduction of liquid coolant into the conditioned air stream.

FIGS. 6a and 6b are partial cross-sectional views of the slotted, heated duct jacket 63 with parallel hot bars 64 shown in FIGS. 2 and 5, while FIGS. 6c and 6d illustrate an alternative embodiment of the heated duct jacket 63 for ice and water removal. FIGS. 6a and 6b illustrate an inner duct wall slot arrangement oriented at an angle to the turbine rotational axis whereas FIGS. 6c and 6d illustrate a slot arrangement perpendicular to the turbine rotational axis. The hot bars 64 in each embodiment are situated between the slots 67 as an anti-ice control provision to prevent ice over or blockage of the slots or openings 67. A conventional mix muff 51 is situated upstream of the heated duct jacket 63. However, unlike the conventional mix muff 26 shown in FIG. 1 which typically consists of throughwall slots or openings for inflow of hot bypass air, it is a feature of the present invention that the annular slots or openings 55 in the duct wall of the mix muff 51 shown in FIG. 2 are shielded or overlapping so as to prevent outflow of ice particles or water droplets but will allow inflow of hot bypass air.

The heated duct jacket 63 encloses a turbine outlet duct 68 and includes a collection sump 69. The jacket 63 comprises a fluid-filled inner liner, a middle collection chamber and outer fluid-filled annular chamber. Within turbine duct 68 is an array of heat exchanger elements 64 and alternating throughwall slots 67 which form part of the turbine duct 68 inner wall. The slots 67, which perforate the turbine duct 68 wall and communicate to the interior of jacket 63, allow ice particles and/or water droplets that may be present in the turbine discharge to enter the heated chamber 63 wherein the ice crystals deposit and melt and the liquid droplets likewise deposit and agglomerate. Ice crystals and/or water droplets present in the turbine 37 discharge tend to migrate radially outward as a result of centrifugal forces induced by the swirl motion imparted by the cooling turbine 37 and therefore tend to be captured or trapped within the collection chamber 63. Once inside the collection chamber 63, the ice particles and/or water droplets will tend to decelerate upon expansion into the larger enclosed volume of chamber 63. The array of heat exchanger elements 64 tend to trap droplets collected and to prevent backscatter and re-entrainment as a result of splash impact on the inner wall surfaces of chamber 63.

The collection sump 69 includes a heated drain 65 to allow drainage of liquid water collected. As shown, the heat exchanger elements 64 may include a parallel arrangement of internal passages for flow of a heated fluid such as hot compressor bleed air to ensure that slots 67 remain ice free and unobstructed. As only the wall surfaces of turbine duct 68 and collection chamber 63 are heated, the use of heat for anti-ice control is minimized. Further energy efficiency results from utilizing either waste heat from the compressor bleed air or heat rejected from the load which is normally rejected overboard as the heat source to maintain the wall surfaces of turbine duct 68 and collection chamber 63 above freezing. The turbine inlet duct 68 includes provisions for addition of add-heat by means of an annular slot 55 immediately downstream of cooling turbine 37 disposed upstream of annular chamber 63 for de-ice operation or temperature control. The annular slot 55 is configured such that the upstream edge overlaps the downstream edge to prevent the entrance of ice particles and /or water droplets present in the air stream.

FIGS. 6c and 6d schematically depict an alternative embodiment of a heat exchanger array for the heated jacket 63. This embodiment is the same as that shown in FIGS. 6a and 6b, except that the heat exchanger elements 64 within the chamber 63 are disposed perpendicular to the longitudinal axis of the exhaust duct 68. The annular collection of elements 64 may be heated by an array of intervening heating passages in a parallel, cross-flow or counter-flow arrangement or in a series wound coil configuration wrapped around the duct. Preferably, the slots 67 should be oriented generally perpendicular to the flow direction from a collection efficiency standpoint; however, the geometry may be modified for manufacturing ease for example.

Figure 7A:
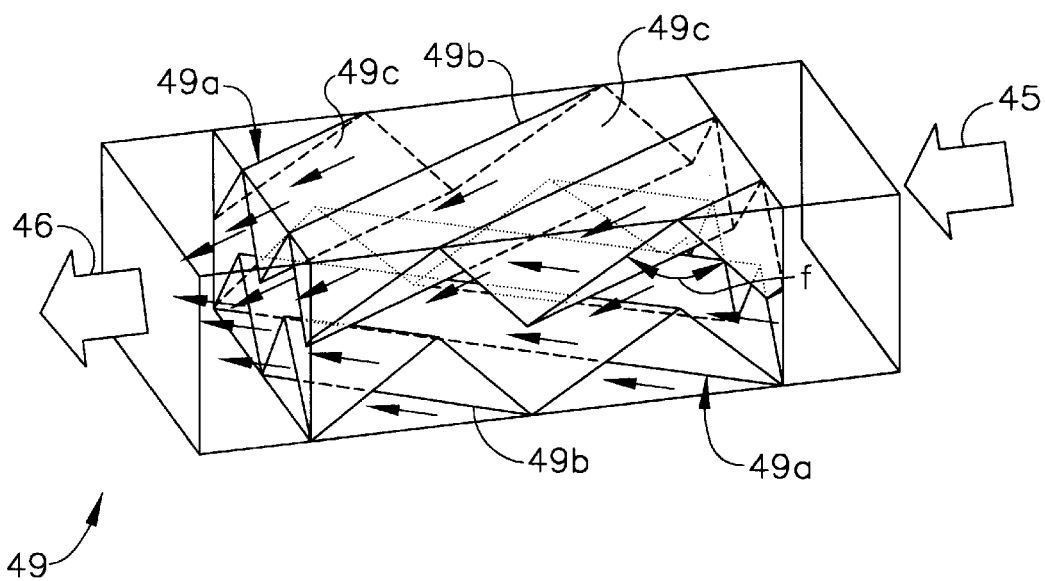
FIG. 7a is a partial, schematic perspective view of a cross-parallel turbulator in accordance with the present invention.
Figure 7B:
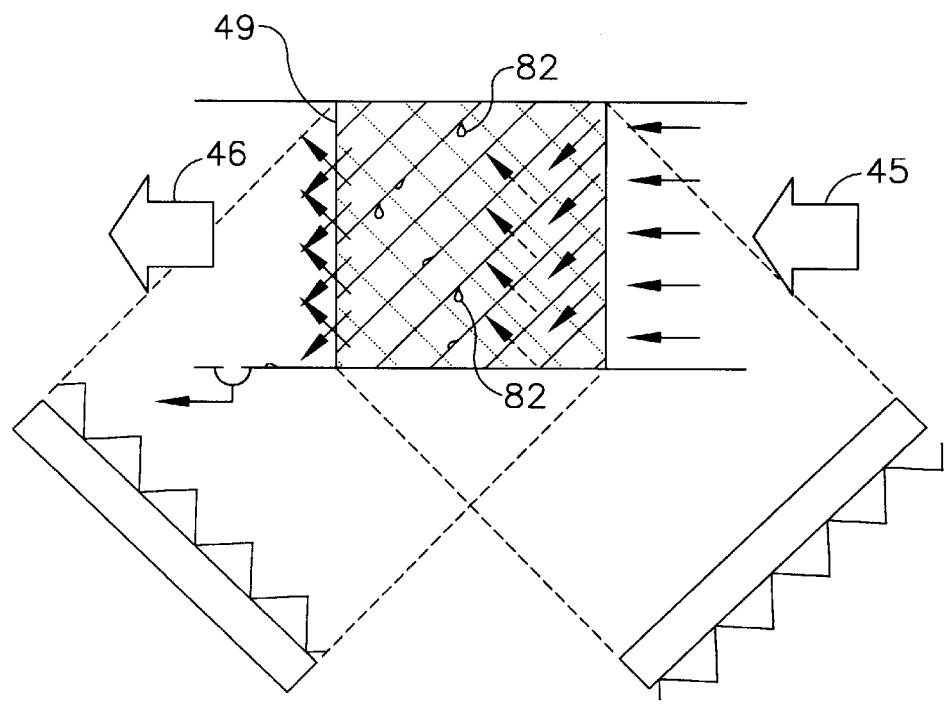

FIG. 7a is a partial perspective view and FIG. 7b is a side elevation view of the turbulator or mixer/coalescer 49 shown schematically in FIGS. 2 and 5. The mixer/coalescer 49 may include a stack of layers of chevron or "wavy" fin elements 49a with each alternating layer oriented in a cross-parallel arrangement such that the fin folds 49b are oriented at an angle with the inlet flow and likewise at an angle with adjacent layers (FIG. 7a). The cross-parallel arrangement is depicted in FIG. 7b by the diagonal lines representing the alternating fin layers, while the crossed arrows show the flow path. For purposes of clarity, only two layers of the mixer/coalescer 49 are shown in projection.

The layered arrangement in the mixer/coalescer 49 serves two principal functions. One is to turbulate the incoming airstream flow 45 as from an upstream heat exchanger, for example, so as to provide momentum transport and mixing of temperature stratified flow. Mixing of flow to provide a more uniform temperature distribution of air discharged from a heat exchanger, for example, is desirable from a system control standpoint to avoid temperature sense errors associated with temperature sensor placement downstream. The temperature sensors are normally a feature of environmental control systems and are used to provide signals to a controller which, in turn, generates command signals to temperature and/or flow control valves to maintain a given temperature/flow control schedule or setting. The alternating channels formed by a staggered fin stack as shown diverts adjacent fluid layers in opposite, lateral directions to the predominate incoming flow stream direction.

A second function of the mixer/coalescer 49 is to provide coalescing action on entrained water droplets 82 that may be present in the airstream 45. For purposes of example, the fin fold 49b direction may be oriented at an ~45 degree direction to the flow 45 axis with a fin fold angle F of ~90 degrees. Due to relatively large open fin spacing and the large incidence angle, water droplets 82 will tend to impinge on the confronting fin surfaces and pile up and agglomerate into larger droplets 82. These larger droplets 82 will tend to flow along the fin folds 49b propelled by the gas flow 45 and be deflected to the sidewalls 49c of the mixer 49. Any ice particles that may be present will likewise tend to be deflected or sloughed off the fin surfaces 49c due to the steep deflection angle. A drainage slot 50 is provided integral with the duct walls downstream of mixer/coalescer 49 for drainage of any accumulated water thus providing drier, conditioned air.

Referring to FIGS. 8a and 8b, another aspect of the invention is shown illustrating a parallel array of heat exchanger elements or hot bars to provide removal of entrained ice particles and/or water droplets present within an airstream. In the embodiment shown in FIGS. 8a and 8b, an ice and water extractor 83 is illustrated and comprises a parallel array of heat exchangers or elements 64 in a chevron fin configuration and in a close-coupled arrangement with an upstream air cycle machine cooling turbine 37. The extractor 83 includes air inlet and outlet ports 83a, 83b; a heated inlet duct connection 83c to an upstream cooling turbine discharge; a multiple array of chevron or zig-zag shaped air passages 83d forming a series of sharp turns of ~90 degrees with the air passages 83d formed by the parallel array of heated heat exchanger elements or hot bars 64 in spaced arrangement; an external heat source 83e such as from an air cycle machine compressor for heating of the heat exchange elements or hot bars 64; a heated fluid passage way or channel 83f to convey a heated fluid such as compressor bleed air from the external heat source 83e; a series of heated slots or openings 83g with an intervening parallel stack of capillary plates or fins 83h in close-spaced, lamellar arrangement incorporated within the parallel heat exchanger arrays; water collection and runoff drainage 83i in fluid connection with the capillary plates and a heated sump 83j with water drain provisions; and an outlet duct 83k connection for delivery of process or conditioned air.

Like the slotted, heated duct arrangement shown in FIG. 6, ice and water removal by the extractor 83 is accomplished by inertial means utilizing a parallel array of hot bars 64. Unlike the embodiment of FIG. 6, however, rather than utilizing the centrifugal force as a result of swirl motion imparted to the flow by virtue of high speed rotation (e.g., ~50,000 rpm) of the cooling turbine 37, inertial separation is accomplished by means of sudden, sharp changes in direction of the velocity vector of the cooling turbine discharge flow. As a result, operation may be independent of the angular velocity of the flow and more of a function of the axial flow velocity (e.g., ~80 ft/sec or more) which may be advantageous in situations, for example, where the flow rotation is adversely impacted by the presence of one or more bends in the turbine discharge outlet to meet installation space limitations for a particular application envelope. Nevertheless, it is to be understood that either method may be used not only with high pressure water separator air cycle environmental control systems with reheater/condenser loops as illustrated in FIGS. 2 and 5, but may also be advantageously applied to low pressure water separation environmental control systems without condensing heat exchangers.

Figure 9A:
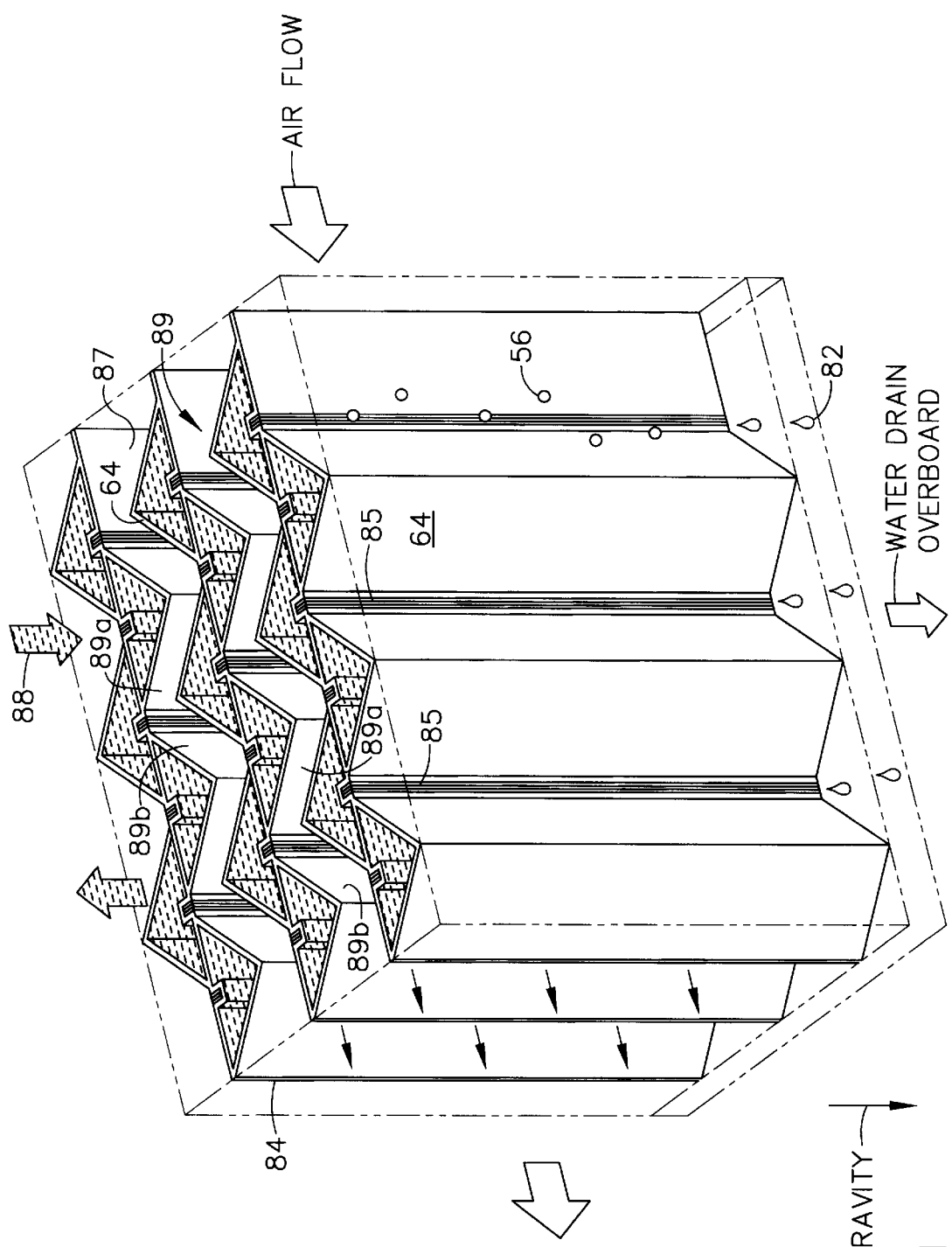
FIG. 9a is a partial perspective schematic diagram of parallel heat exchanger elements in a heat exchanger array such as illustrated in FIG. 8a and shown in isolation in accordance with the present invention.
Figure 9B:
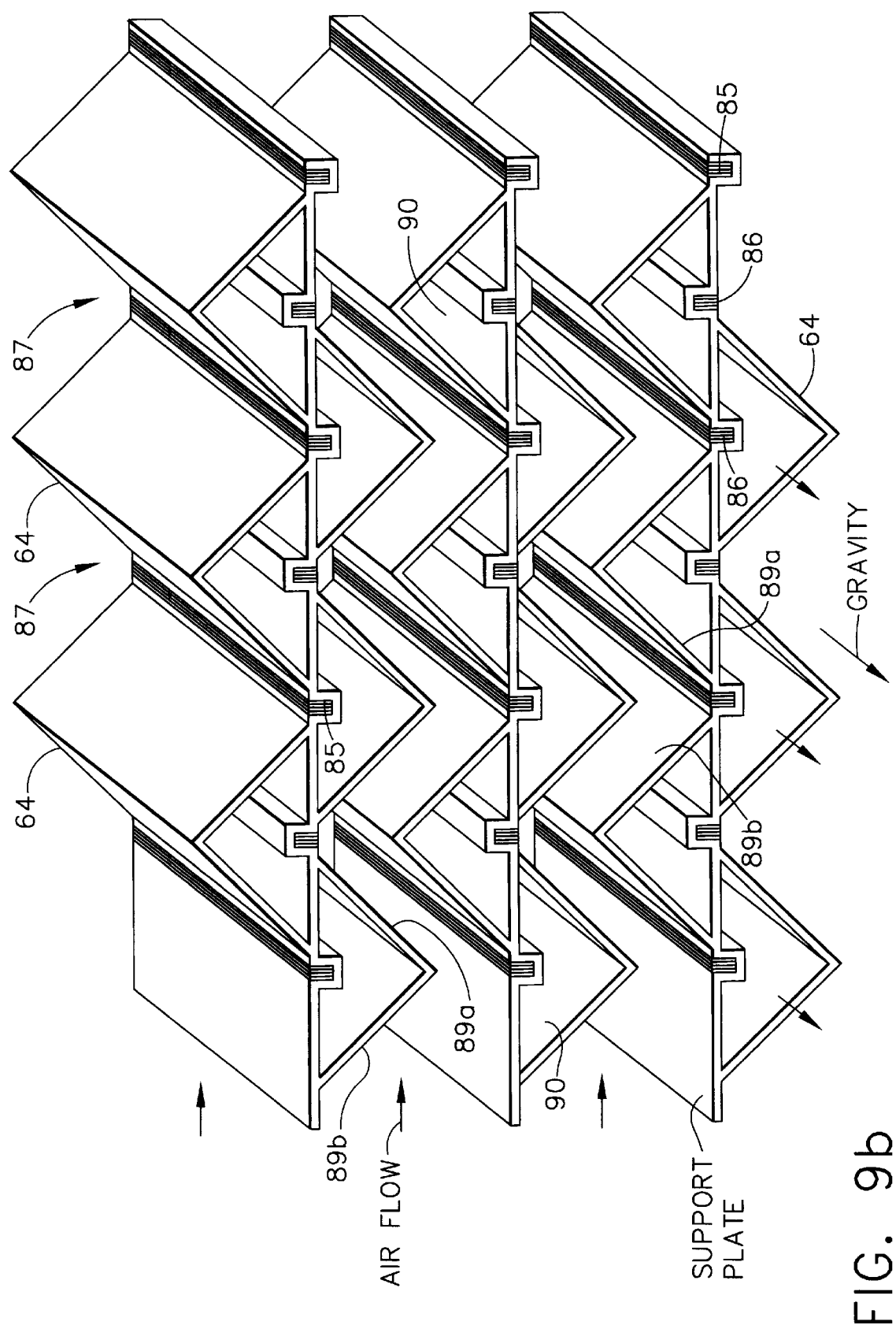

FIG. 9a is a partial cross-section view and FIG. 9b is partial end view of another preferred embodiment of the extractor 83 shown in FIGS. 8a and 8b. In FIGS. 9a and 9b, a series of heat exchange elements or hot bars 64 of a generally triangular cross-section and disposed in a parallel array forming multiple air passages 89 in a chevron or zigzag configuration. Each passage 89, in turn, is formed by a stacked arrangement of the heat exchange elements or hot bars 64 in preferably a vertical orientation with respect to gravity mounted on a series of support plates 84 in a parallel spaced relation with each triangular-shaped element 64 separated from adjoining elements 64 by an intervening slot or opening 85.

Disposed within each slot or opening 85 is a series of closely-spaced capillary plates or fins 86 oriented perpendicular to the general airflow direction and extending the length of the slot 85. In a preferred arrangement, the capillary plates or fins 86 are made of a suitable corrosion resistant material such as stainless steel or nickel for example and on the order of ~0.01 to 0.1 in. thickness and may be in direct physical contact with one another. The capillary plates 86 are mounted within a U-shaped channel 87 situated between adjoining triangular-shaped heat exchange elements or hot bars 64 and are in thermal contact with a heated fluid 88 contained within the heat exchange elements or hot bars 64. The heated fluid 88 in a preferred embodiment is derived from hot compressed bleed air tapped off the air cycle machine compressor discharge.

In operation, cold turbine discharge air, which may be of subfreezing temperatures, is admitted to the air passage inlet through a duct connection to an inlet pan or manifold. In a typical application, the inlet flow velocity may be on the order of ~80 or more ft/sec with a flow rate of ~60 or more lbs/min. The airflow is constrained to follow within a plurality of chevron or zigzag heated air passages 89 within an enclosed housing. Entrained ice particles 56 and/or water droplets 82 which may be present in the airstream will tend to impact the confronting surfaces of the triangular-shaped heat exchange elements 64. Ice particles and water droplets present in the airstream, typically on the order of ~1 to 1,000 microns in size, are several orders of magnitude larger and more massive and considerably less mobile than air molecules and, consequently, tend to impact and deposit on confronting surfaces during sharp turns. Not all of the ice and/or water present will be removed, as with any inertial separator, submicron ice particles or water vapor present will, in general, tend to flow with the airstream where the inertial forces become less dominant compared to viscous drag forces at low Reynold's number regimes. Ice crystals or particles present in the airstream will tend to melt on contact with the heated wall surfaces of the triangular-shaped heat exchange elements or hot bars 64 which are heated to above freezing temperature. The liquid water droplets will tend to impact and agglomerate on the leading exposed edges of the capillary plates 86 downstream of the heated triangular-shaped elements 64 and will tend to wick between the capillary plates 86 as a result of surface capillary action.

The chevron or zigzag-shaped passages 89 may include alternating converging segments 89a and diverging segments 89b that provide increased acceleration of flow for enhanced droplet impingement, agglomeration and wicking of water droplets. The liquid water wicked away from the airstream will tend to flow in a generally downward direction in response to gravity within the heated flow channels provided and collect in the lower drainage pan or sump. Ice-over, blockage or refreezing of the slotted, capillary channels 85 is prevented by heat transfer from the surrounding triangular-shaped heat transfer elements 64 and heat conduction through each capillary plate 86 with only the leading edge surfaces exposed to the cold air stream. Dirt or particulate contamination present in the airstream which deposits and adheres to the capillary plate 86 surfaces will tend to be washed away with the liquid water drainoff; hence, the device tends to be self-cleaning with little or no maintenance required. The lower drain sump or plenum is equipped with a water drain for overboard disposal and may be conveniently plumbed to existing water drains or humidification reservoirs elsewhere in the environmental system.

FIGS. 10a and 10b depict another embodiment of an ice and water extractor 83 utilizing a parallel array of heat exchange elements or hot bars 64. In contrast to the embodiment of FIGS. 9a to 9c, the parallel heat exchanger elements 64 comprise a series of thermally interconnected tubular heat exchange elements 64a. The tubular elements 64a may include a central drain tube 64b that is in liquid communication with a pair of capture inlets 64c that receive ice particles 56. A partially annular tubular segment 64d surrounds the drain tube 64b. A heating segment 64e thermally connects one tubular element 64a to another. When ice 56 is captured in the inlets 64c, the tubular segments 64d melt the ice 56, with the resulting water being drained by the drain tubes 64b.

It should be understood, of course, that the foregoing relates to preferred embodiments of the invention and that modifications may be made without departing from the spirit and scope of the invention as set forth in the following claims.

We claim:

1. In an environmental control system, a heat exchanger subsystem for improved cooling, anti-ice control and energy efficiency, comprising:

a heat exchanger array having a plurality of heat exchanger elements that operate in parallel to an inlet cooling airflow to said heat exchanger array and wherein each heat exchanger element is thermally connected to a separate load and is thermally isolated from each other; and a turbulator downstream of said heat exchanger array.

2. In an environmental control system, a heat exchanger subsystem for improved cooling, anti-ice control and energy efficiency, comprising:

a heat exchanger array having a plurality of heat exchanger elements that operate in parallel to an inlet cooling airflow to said heat exchanger array and wherein each heat exchanger element is thermally connected to a separate load and is thermally isolated from each other;

at least a third heat exchanger element that is internal or external to at least one of said first and second heat exchanger elements, said third heat exchanger element preventing ice accumulation on a coldside inlet of at least one of said first and second heat exchanger elements;

a heat source for heating said third heat exchanger element; and one of said first and second heat exchanger elements is an air-to-air heat exchanger downstream of said third heat exchanger element.

3. The heat exchanger subsystem of claim 1, wherein said heat exchanger elements comprise at least one air-to-air heat exchanger and at least one liquid-to-air heat exchanger.

4. The heat exchanger subsystem of claim 1, further comprising:

a heat sink thermally connected to said plurality of heat exchanger elements; and a plurality of heat sources thermally connected to said plurality of heat exchanger elements, said heat sources being air or liquid.

5. The heat exchanger subsystem of claim 1, further comprising:

at least a third heat exchanger element that is internal or external to at least one of said first and second heat exchanger elements, said third heat exchanger element preventing ice accumulation on a coldside inlet of at least one of said first and second heat exchanger elements;

a heat source for heating said third heat exchanger element; and one of said first and second heat exchanger elements is an air-to-air heat exchanger downstream of said third heat exchanger element.

6. The heat exchanger subsystem of claim 5, wherein said heat source-comprises compressed bleed air or heated liquid returned from a liquid-cooled load.

7. The heat exchanger subsystem of claim 2, further comprising a turbulator downstream of said heat exchanger array.

8. An air cycle environmental control system, comprising:

a heat exchanger subsystem downstream of a cooling turbine, said subsystem having an air-to-air heat exchanger core and a liquid-to-air heat exchanger core which operate in parallel to an inlet airflow to said heat exchanger subsystem.

9. The environmental control system of claim 8, wherein said air-to-air heat exchanger core and said liquid-to-air heat exchanger core receive in parallel a turbine discharge air.

10. The environmental control system of claim 8, wherein said heat exchanger subsystem further includes at least one heat exchanger element proximate to a coldside inlet of at least one of said air-to-air heat exchanger core and liquid-to-air heat exchanger core.

11. The environmental control system of Claim 10, wherein said at least one heat exchanger element is disposed internal to said one of said air-to-air heat exchanger core and liquid-to-air heat exchanger core.

12. The environmental control system of claim 10, wherein said at least one heat exchanger element is disposed external to said one of said air-to-air heat exchanger core and liquid-to-air heat exchanger core.

13. The environmental control system of claim 8, further comprising a plurality of heat exchanger elements disposed in parallel and adjacent to one of said air-to-air heat exchanger core and liquid-to-air heat exchanger core.

14. The environmental control system of claim 13, wherein at least one of said plurality of heat exchanger elements is thermally connected to a first load and another of said plurality of heat exchanger elements is thermally connected to a second load that is thermally independent of said first load.

15. The environmental control system of claim 8, wherein said heat exchanger subsystem further includes a turbulator adjacent to a coldside outlet of at least one of said air-to-air heat exchanger core and liquid-to-air heat exchanger core.

16. In an environmental control system having a turbine exhaust duct, a heat exchanger subsystem for cooling, anti-ice control and energy efficiency, comprising:
   a chamber disposed about said turbine exhaust duct;
   a heat exchanger array within said chamber;
   said heat exchanger array including a plurality of heat exchanger elements in parallel to one another; and
   a heat source thermally connected to said heat exchanger array.

17. The heat exchanger subsystem of claim 16, further comprising a plurality of slots interposed among said heat exchanger elements.

18. The heat exchanger subsystem of claim 17, further comprising a drain in liquid communication with said slots.

19. The heat exchanger subsystem of claim 16, wherein said heat exchanger elements are disposed obliquely to a longitudinal axis of said turbine discharge duct.

20. The heat exchanger subsystem of claim 16, wherein said heat exchanger elements are disposed perpendicular to a longitudinal axis of said turbine discharge duct.

21. The heat exchanger subsystem of claim 16, wherein said heat source comprises compressed bleed air.

22. A method of conditioning a compressed air and cooling a liquid load, comprising:
   expanding said compressed air in a turbine to produce a turbine discharge air;
   flowing said turbine discharge air in parallel to a plurality of heat exchanger cores, with at least one of said heat exchanger cores being thermally connected to a first load and at least another of said heat exchanger cores being thermally connected to a second load that is thermally independent of said first load.

23. The method of claim 22, further comprising controlling ice accumulation from said turbine discharge air by disposing a heat exchanger array adjacent a coldside inlet of at least one of said one and another of said heat exchanger cores.

24. The method of claim 23, further comprising heating said ice with a heat exchanger element internally of at least one of said one and another of said heat exchanger cores.

25. The method of claim 23, further comprising heating said ice with a heat exchanger element externally of at least one of said one and another of said heat exchanger cores.

26. The method of claim 22, further comprising orienting a coldside air inlet of said one heat exchanger core adjacent to a coldside air inlet of said another heat exchanger core.

27. The method of claim 22, further comprising creating a turbulent air flow at a coldside air outlet of said one heat exchanger core and a coldside air outlet of said another heat exchanger core.

28. The method of claim 22, further comprising warming said compressed air at a coldside air inlet of at least one of said one and another heat exchanger cores.

29. The method of claim 22, further comprising recovering rejected heat from at least one of said first and second loads.

30. The method of claim 22, further comprising maximizing a simultaneous receipt of said compressed air by said heat exchanger cores.

31. The heat exchanger subsystem of claim 2, wherein said heat exchanger elements comprise at least one liquid-to-air heat exchanger.

32. The heat exchanger subsystem of claim 2, further comprising:
   a heat sink thermally connected to said plurality of heat exchanger elements; and
   a plurality of heat sources thermally connected to said plurality of heat exchanger elements, said heat sources being air or liquid.

33. The heat exchanger subsystem of claim 2, wherein said heat source-comprises compressed bleed air or heated liquid returned from a liquid-cooled load.

34. An air cycle environmental control system with a parallel, multi-core heat exchanger subsystem, comprising:
   two or more heat exchangers in a parallel, multi-path arrangement situated downstream of an air cycle machine cooling turbine and exposed to subfreezing turbine discharge air stream, said heat exchangers comprising one or more air-to-air heat exchangers and/or one or more liquid-to-air heat exchangers.

35. The heat exchanger subsystem of claim 34, wherein said heat exchangers may be separated by one or more bypass gaps or passageways.

36. The heat exchanger subsystem of claim 35, wherein said bypass gaps or passageways are located between cores minimizing heat transfer between cores and potential load interaction effects.

37. The heat exchanger subsystem of claim 35, wherein said said bypass gaps or passageways include one or more heated surfaces to prevent ice accumulation or obstruction of said bypass gaps or passageways.

38. An air cycle environmental control system with a parallel, multi-core heat exchanger subsystem, comprising:
   a plurality of anti-ice heat exchange elements in a substantially parallel arrangement immersed in a subfreezing cooling air turbine discharge disposed between a cooling turbine outlet and one or more downstream heat exchangers to prevent ice buildup, bridge over and obstruction of the inlet face of the one or more downstream heat exchangers.

39. The heat exchanger subsystem of claim 38, wherein said heat exchange elements include perforations or passageways to heated chambers or cavities to collect and melt accumulated ice thereby removing condensed ice particles and/or water droplets present in turbine discharge from the airstream further minimizing ice accumulation tendency within or on downstream heat exchangers.

40. The heat exchanger subsystem of claim 38, wherein said anti-ice heat exchange elements comprise hollow tubes located proximal to, but not necessarily in physical contact with the heat exchangers.

41. The heat exchanger subsystem of claim 38, wherein said heat exchange elements comprise anti-ice hot bars that are located upstream and external to a liquid-air heat exchanger of relatively high fin density and upstream and internal to an air-to-air heat exchanger of relatively low fin density and utilizing a suitable heat source such as hot air or liquid.

42. The heat exchanger subsystem of claim 1, wherein said hot bars may be of graded size in a tube bundle situated in front of the heat exchanger cores with larger tubes upstream and smaller tubes downstream.

43. An air cycle environmental control system with a parallel, multi-core heat exchanger subsystem, comprising:
   a heated plenum connecting an air cycle machine cooling turbine subfreezing cooling air discharge to said two or more heat exchangers in a parallel, multi-path arrangement situated downstream of an air cycle machine cooling turbine.

44. The heat exchanger subsystem of claim 43, wherein said heated plenum is a heat exchanger being either an air-to-air or a liquid-to-air heat exchanger.

45. In an environmental control system, a heat exchanger subsystem for improved cooling, anti-ice control and energy efficiency, comprising:

a heat exchanger array having a plurality of heat exchangers that operate in parallel to an inlet cooling airflow to said heat exchanger array and wherein each heat exchanger is thermally connected to a separate load and is thermally isolated from each other; and a plurality of heat exchanger elements or hot bars that are upstream of and in proximity with, either internal or external to, said heat exchangers, said heat exchanger elements preventing ice accumulation on a coldside inlet of said heat exchangers.

46. The heat exchanger subsystem of claim 45, wherein said heat exchange elements or hot bars are in the form of a single row tube array.

47. The heat exchanger subsystem of claim 45, wherein said heat exchange elements or hot bars are in the form of a multi-row tube bundle of a graded size of progressively smaller diameter with larger tubes upstream and smaller tubes downstream and situated upstream of said heat exchangers.

48. The heat exchanger subsystem of claim 45, further comprising a heat source for heating said heat exchanger elements.

49. The heat exchanger subsystem of claim 45, further comprising:

a heated chamber or passageway for melting of ice crystals admitted through an array of hot bar elements; and a collection sump for water droplets and melted ice/liquid water and drainage means for removal of said melted ice and/or liquid water.

50. The heat exchanger subsystem of claim 45, further comprising a turbulator downstream of said heat exchanger array.

51. The heat exchanger subsystem of claim 45, wherein said heat exchangers comprise two or more liquid-to-air heat exchangers.

52. The heat exchanger subsystem of claim 45, further comprising:

a heat sink thermally connected to said plurality of heat exchanger elements to reduce heat load interaction effects between said plurality of heat exchangers and thereby thermally isolate each heat exchanger; and a plurality of heat sources thermally connected to said plurality of heat exchanger elements, said heat sources being thermally connected with a heat exchange fluid medium such as air or liquid.

53. The heat exchanger subsystem of claim 48, wherein said heat source comprises compressed bleed air or heated liquid returned from a liquid-cooled load.

* * * * *